United States Patent [19]

Miller et al.

[11] Patent Number: 5,062,500

[45] Date of Patent: Nov. 5, 1991

[54] LOW PROFILE CART FOR THE INSITU COLLECTION FILTERATION AND RECYCLE OF FLUIDS FROM MACHINERY

[75] Inventors: Robert E. Miller, Mount Joy; F. Jay Eichelberger, Jr., Paradise, both of Pa.

[73] Assignee: Ford New Holland, Inc., New Holland, Pa.

[21] Appl. No.: 619,286

[22] Filed: Nov. 28, 1990

[51] Int. Cl.$^5$ ............................................. F16N 31/00
[52] U.S. Cl. ................................. 184/106; 184/1.5; 220/573
[58] Field of Search ................. 184/1.5, 106; 220/573, 220/571

[56] References Cited

U.S. PATENT DOCUMENTS

| | | | |
|---|---|---|---|
| 1,554,589 | 9/1925 | Long | 184/1.5 |
| 1,702,703 | 2/1929 | Osborne | 184/1.5 |
| 2,029,781 | 2/1936 | McLean | 184/1.5 |
| 4,095,672 | 6/1978 | Senese | 184/1.5 |
| 4,095,673 | 6/1978 | Takeuchi | 184/1.5 |
| 4,114,644 | 9/1978 | Piper | 220/573 |
| 4,354,574 | 10/1982 | Kieber | 184/1.5 |
| 4,420,023 | 12/1983 | Cislak | 184/1.5 |
| 4,698,983 | 10/1987 | Hechavarria | 141/198 |
| 4,727,904 | 3/1988 | Lease | 137/565 |
| 4,938,315 | 7/1990 | Ohta et al. | 184/1.5 |

*Primary Examiner*—Ira S. Lazarus
*Assistant Examiner*—Alan B. Cariaso
*Attorney, Agent, or Firm*—Frank A. Seemar; Larry W. Miller; Darrell F. Marquette

[57] ABSTRACT

A cart for draining, filtering and recycling oil or similar viscous fluids from vehicles comprising a wheel mounted fluid receiving chamber having a front to rear slope, handle means for positioning the open chamber beneath a vehicle, vertically disposed baffle plates positioned within the chamber to reduce movement of the fluid collected therein, drain means connected to the rear of the fluid receiving chamber and in fluid communication with a pump and filter means mounted alongside the chamber which provides pumping and filtering of the collected fluid to remove particles entrained therein and reintroduction of the filtered fluid back into the vehicle.

24 Claims, 3 Drawing Sheets

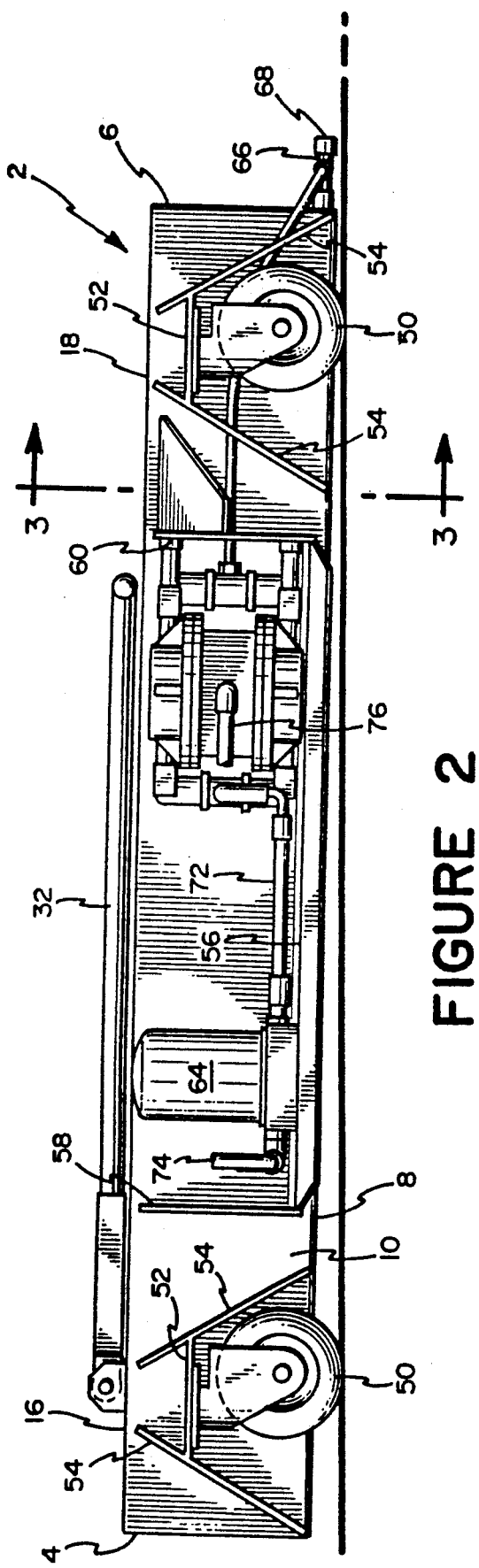
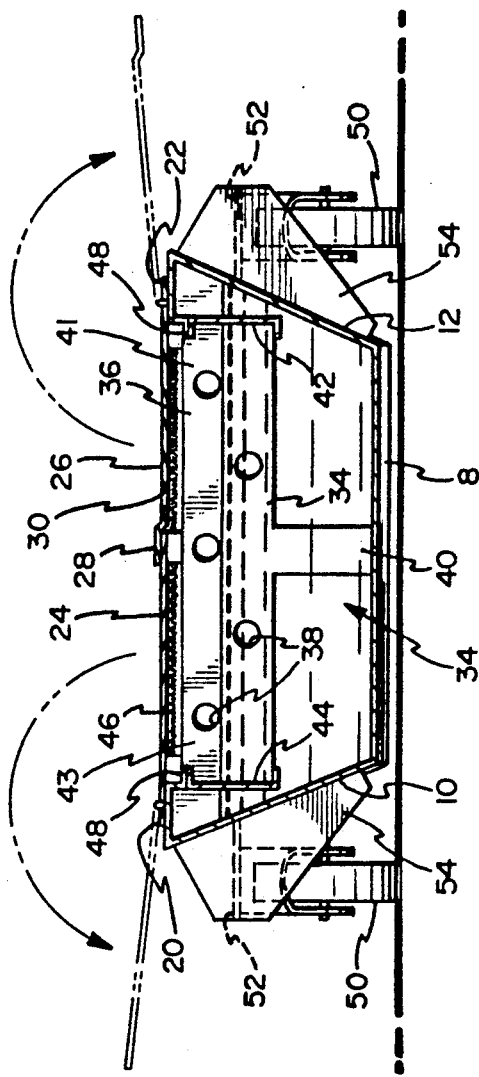
FIGURE 2
FIGURE 3

LOW PROFILE CART FOR THE INSITU COLLECTION FILTERATION AND RECYCLE OF FLUIDS FROM MACHINERY

FIELD OF THE INVENTION

The present invention relates to apparatus for the collection, filteration and recycle of transmission fluid and similar viscous fluids from machinery.

BACKGROUND OF THE INVENTION

Conventionally, internal combustion engines and associated components such as transmissions and gearings require lubrication fluids to ensure smooth operation and extended life. These lubrication oils must be periodically removed and replaced to maintain optimum lubrication and engine performance. This requirement of periodic fluid maintenance is particularly apparent with farm vehicles and associated machinery due to the harsh working environment such machinery is often subjected to. Further, farm equipment requires large amounts of lubrication fluid. For example, the transmissions of farm tractors can require upwards 32 to 35 gallons of expensive, special grade transmission fluid. A common problem associated with such fluid is that with extended use metal particles from transmission gearing wear become entrained within the fluid, thereby requiring replacement of the fluid. Routine replacement of contaminated transmission fluid becomes necessary to extend the life of the equipment. Although such replacement is very often a costly expenditure for the owner, failure to do so may result in mechanical breakdown and costly repairs. This problem is not limited to transmissions, but also includes the lubrication oil in the crankcase of the internal combustion engine itself. This oil must also be periodically changed as it is subject to contamination from engine wear deposits.

The actual replacement of the fluid or oil can be a cumbersome and a messy operation when handling large quantities of fluid. Currently, the narrow clearances beneath the vehicles and the multiple compartments and casings which must be opened and drained restrict the oil change equipment to conventional drain pans or the like. In addition, transferring oil from a drain pan situated beneath the vehicle to a remote location is difficult when dealing with such large quantities of oil. Further, if the drained fluid is to be reused it must be somehow filtered prior to refilling back into the machinery. All of these independent steps and procedures combine to make fluid and oil replacement an expensive, tedious, time consuming and dirty operation.

Numerous apparatus exists in the prior art for replacement of engine oil or similar fluids. U.S. Pat. No. 4,727,904 (Lease) discloses a drain tray apparatus mounted on rollers for collecting coolant from an internal combustion engine. The device includes an electric pump which conveys fluid collected in the pan through a conduit into the tubular handle for recycling back into the automobile radiator. U.S. Pat. No. 4,938,315 (Ohta) and U.S. Pat. No. 4,095,673 (Takeuchi) disclose apparatus for exchanging oil including a pump which extracts the oil from the vehicle as well as a reservoir and pump which replaces the extracted oil with fresh oil. U.S. Pat. No. 4,420,023 (Cislak) discloses a device for collecting heavy oil from machinery and transferring the oil under pressure to a remote container for reuse or reclamation. U.S. Pat. No. 4,095,672 (Senese) and U.S. Pat. No. 4,354,574 (Kieber) disclose wheeled oil drums equipped with a compressor or a pump means allowing extraction of the oil from the oil pump of the automobile engine via conduit lines. U.S. Pat. No. 4,698,983 (Hechavarria) discloses a hand pump for removing oil from a compressor to a remote reservoir.

OBJECTS AND SUMMARY OF THE INVENTION

It is therefore an object of the present invention to provide an apparatus which can simultaneously collect, filter and reintroduce oil or similar fluids back into machinery.

It is an additional object of the present invention to provide a low profile cart which can be readily positioned beneath a variety of vehicles to receive oil drained therefrom.

Yet a further object of the present invention is to provide an apparatus which will filter and clean transmission fluid in situ for reintroduction back into a vehicle's transmission casing.

An additional object of the present invention is to provide an apparatus which combines an oil receptacle, pump means with associated valving and filter means on a single, unitary structure.

A still further object of the present invention is to provide an apparatus which has the capacity to either filter fluid or to direct the drained fluid directly into a remote storage receptacle.

An additional object of the present invention is to provide an apparatus for receiving oil to be drained from a vehicle which is large enough to simultaneously accommodate numerous drainplug locations beneath a vehicle.

Another object of the present invention is to provide a fluid collection device which can be positioned and moved freely when filled to capacity with no spillage or waste.

These objects and others can be attained by an apparatus according to the present invention, which comprises a wheel mounted fluid receiving chamber having a front to rear slope, handle means for positioning the open chamber beneath a vehicle, vertically disposed baffle plates positioned within the chamber to reduce movement of the fluid collected therein, drain means connected to the rear of the fluid receiving chamber and in fluid communication with a pump and filter means mounted alongside the chamber to provide pumping of the collected fluid through the filter to remove particles entrained therein and subsequent reintroduction into the vehicle. The invention will be explained in more detail with respect to preferred embodiments by reference to the accompanying drawings and specification.

BRIEF DESCRIPTION OF THE DRAWINGS

FIG. 2 is a side elevational view of the apparatus shown in FIG. 1.

FIG. 3 is a cross sectional view of the apparatus shown in FIG. 2 taken along lines 3—3 and viewed in the direction of the arrows and with the doors of the cart in an open position as shown in phantom lines.

FIGS. 1 THROUGH 4

Figure 1:
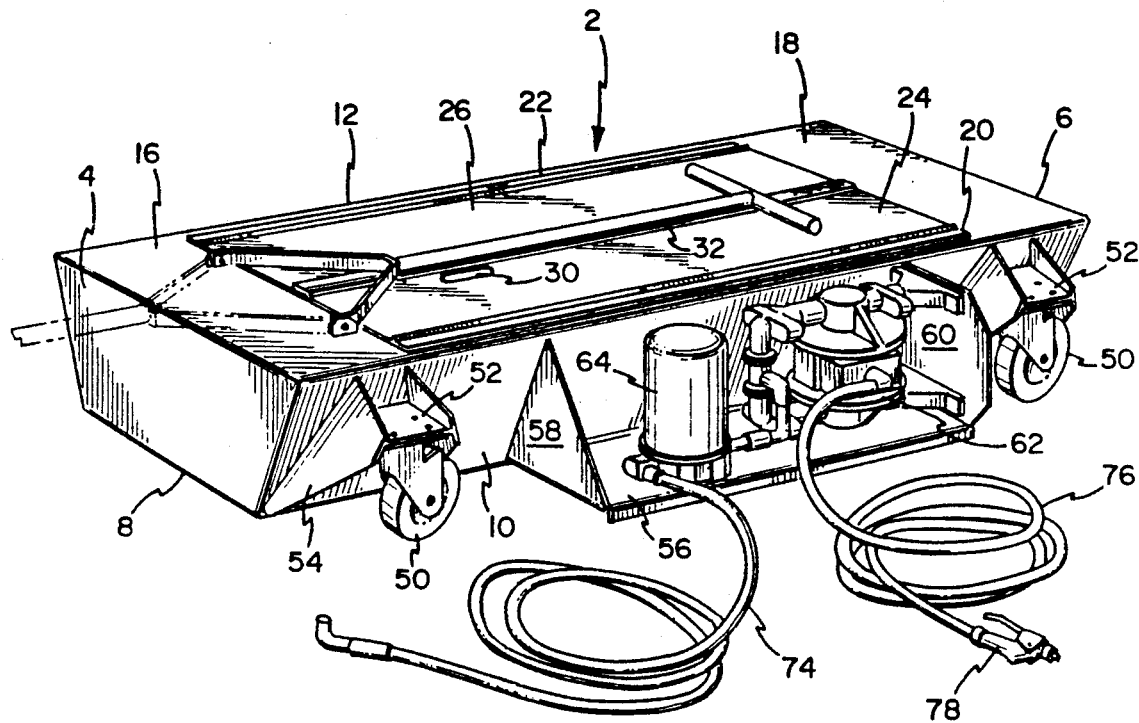
FIG. 1 is a perspective drawing of the apparatus according to the present invention.
Figure 5:
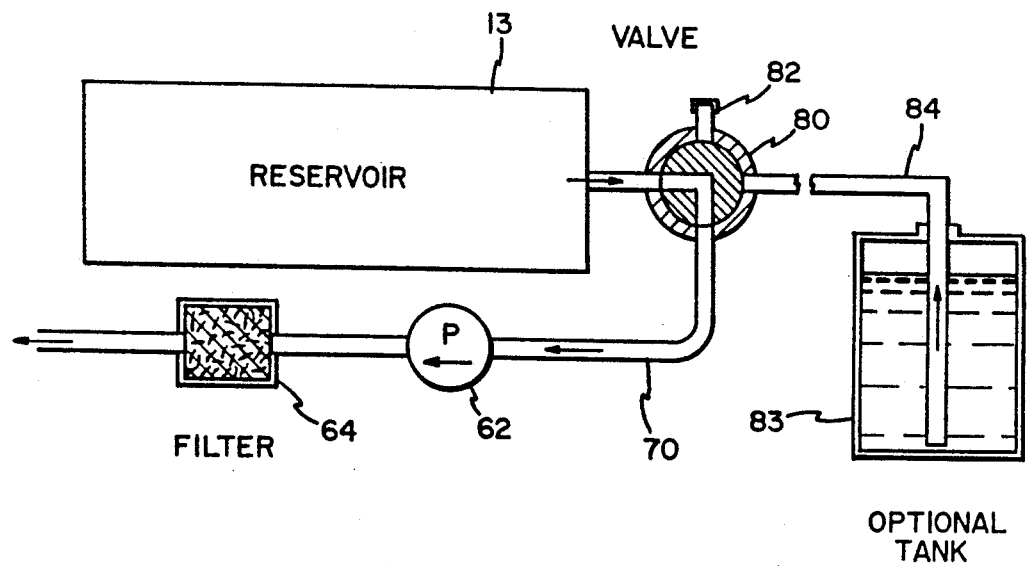
FIG. 5 is a schematic diagram illustrating the fluid connections between the reservoir filter and pump and valve as well as an additional embodiment.

As best shown in FIG. 1 and 3, the low profile cart 2 of the present invention includes a front 4, rear 6, bottom 8, left panel 10 and right panel 12 defining a fluid receiving chamber 13. An opening 14 (FIG. 4) which leads to the fluid receiving chamber 13 is formed in the top surface of the low profile cart 2 and is situated between front deck 16, rear deck 18 and side rails 20 and 22. A pair of doors 24 and 26 are hingedly attached to side rails 20 and 22 and are supported by front deck 16 and rear deck 18. Door 26 includes a handle 30 to allow lifting of the door into an open position as best shown in the phantom lines of FIG. 3. When the doors 24 and 26 are in the closed position, they overlap at portion 28 to provide a relatively flush surface along the top of the cart 2. A positioning means 32 comprising an elongated handle is hingedly attached to the front deck 16 and is movable from a stowed position overlying the doors 24 and 26 to an operating position as illustrated in phantom lines of FIG. 1.

Turning to FIG. 3, the fluid receiving chamber 13 can be seen to have a truncated shape with the left panel 10 and right panel 12 disposed at an inward angle towards the bottom panel 8. The net effect of such an arrangement is to reduce the surface area of the bottom panel 8 thereby increasing the amount of fluid which is drained from the fluid receiving chamber 13 through drain 66. A series of baffle plates 34 are positioned vertically within the fluid receiving chamber 13 and extend between the left panel 10 and right panel 12. The baffle plates 34 have a generally T-shaped configuration with the upper plate portion 36 including a series of perforations or holes 38 each of which has a diameter extending from about two and a half inches to about four inches. The baffle plates 34 are secured to the bottom panel 8 of the fluid receiving chamber 13 at vertical support 40. The upper plate portion 36 is secured at end portions 41 and 43 to downwardly projecting flanges 42 and 44. It is understood that any arrangement for attaching the baffle plates 34 within the fluid receiving chamber 13 (FIG. 4) is contemplated within the scope of the present invention so long as the plates 34 are positioned in series along the length of the low profile cart 2 and are disposed vertically between the left panel 10 and the right panel 12. The net effect of positioning the baffle plates 34 within the interior of the fluid receiving chamber 13 is to reduce uncontrolled sloshing and movement of fluid within the chamber 13 while the cart 2 is being moved. The baffle plates 34 are particularly advantageous when the fluid receiving chamber is filled to capacity. The disposition of the upper plate portions 36 near the top half of the fluid receiving chamber 13 reduces the opportunity for fluid to spill from the cart opening 14. Baffles 34 are also used to strengthen sides of tank for wheel support, and support 40 is welded to baffles 34 and bottom 8. To keep it from bulging when loaded with oil.

Figure 4:
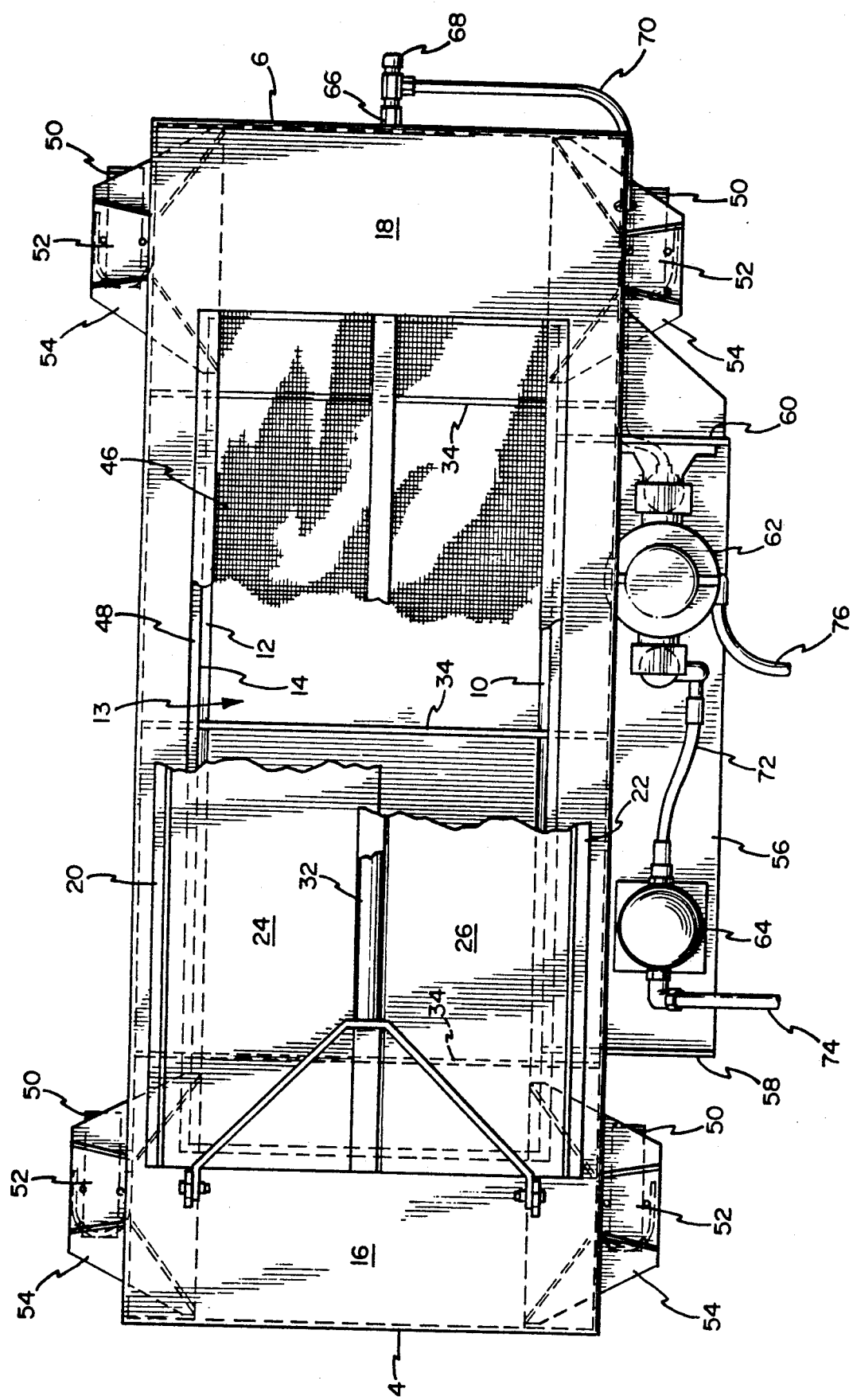
FIG. 4 is a top plan view of the apparatus shown in FIG. 1 with portions of the door means and the screen means broken away to reveal the fluid receiving chamber.

Turning now to FIGS. 3 and 4, a screen 46 is disposed beneath the doors 24 and 26 and within the opening 14 situated above the fluid receiving chamber 13. The screen may be supported upon a ledge 48 which extends along the perimeter of the opening 14. The screen 46 is positioned above the baffle plates 34 and partially rests upon the upper plate portion 36 of the baffle plates 34. When positioned over the opening 14, the screen 46 lies below the plane of the top surface of the cart 2 and the doors 24 and 26. The screen is provided with a mesh sizing sufficient to strain metal particles and other debris from the vehicle fluid which is drained into the fluid receiving chamber 13. After use, the screen may be readily removed from the apparatus and rinsed of the accumulated metal particles and debris.

The cart 2 this provided with four castor wheels 50 to allow movement and positioning of the cart 2. Two of the wheels 50 are positioned off of the left panel 10 with one wheel near the front 4 and the other wheel near the rear 6 of the cart 2. Similarly, the remaining two wheels 50 are positioned off of the right panel 12 near the front 4 and rear 6 of the car 2. The wheels 50 are mounted to and positioned below horizontal brackets 52 extending outwardly from the left panel 10 and the right panel 12. Additionally, downwardly extending flanges 54 are positioned in front of and behind each wheel 50 and serve to distribute load and protect the wheels 50 against damage during movement and positioning of the cart 2. The cart 2 is provided with a slope, downwardly extending from the front 4 to the rear 6. The slope measures from one half inch to three quarters of an inch in height from front to rear. The positioning of the horizontal brackets 52, located near the front 4 of the cart 2 is set below that of horizontal brackets 52 located near the rear 6 of the cart 2. This arrangement results in the front 4 of the cart 2 being raised relative to the rear 6. The chamber slope provides increased efficiency when draining collected fluid from the chamber 13 out of the drain 66 positioned in the rear of the cart 2. Various other wheel arrangements are contemplated within the scope of the present invention so long as they provide free movement of the cart in all directions. For example, the wheels 50 need not be positioned at an unequal height from front 4 to rear 6 if the interior construction of the fluid receiving chamber 13 is constructed with an integral sloping bottom 8.

A side support shelf 56 is affixed to the left panel 10. Additional support means include side panels 58 and 60. Supported on the shelf 56 are fluid pump 62 and filter 64. In the preferred embodiment, the fluid pump 62 is a diaphragm type pump which is pneumatically driven. Diaphragm pumps contain a minimum of moving parts and among other things are less subject to failure when pumping non-corrosive fluids. However, it is within the scope of the present invention to use other pumps known in the art which will effectively convey the fluid collected in the fluid receiving chamber 13. Such pumps may be electrically driven or otherwise. The filter 64 is in fluid connection downstream from the pump 62. The present invention contemplates the use of a number ten size microfilter widely known in the art. It is further within the scope of the present invention to use fluid filters of varying pore size and construction so long as they are capable of cleaning the fluid which is collected in the cart 2. An additional feature of the present invention is that the dimensions of both the fluid pump 62 and the filter 64 be such that when mounted on the side support shelf 56, they lie below the plane of the top of the cart 2. These size restrictions ensure that the cart 2 will retain sufficient clearance for positioning beneath a vehicle to be serviced.

Positioned within the rear panel 6 near the bottom 8 is a drain 66 including drain cap 68. A fluid line 70 extends from the drain 66 and into the fluid pump 62. A second fluid line 72 extends between the fluid pump 62 and the downstream filter 64 with an outlet line 74 projecting from the filter 64. An air line 76 is also connected to fluid pump 62 and during use connects to an air compressor or similar device (not shown) via adapter end 78 which adjusts air flow into fluid pump 62 for varied fluid pump speeds.

In use, doors 24 and 26 are opened exposing the opening 14 and the fluid receiving chamber 13. The cart 2 is then positioned beneath a vehicle to be serviced so that all the drain plugs on the vehicle are positioned above the open fluid receiving chamber 13. The vehicle drainplugs are opened allowing fluid in the transmission compartments to be simultaneously emptied into the receiving chamber 13. After the fluid has been drained from the vehicle, the fluid filled cart 2 can be removed from underneath the vehicle to a location adjacent a suitable compressor or left underneath the vehicle if the air line 76 is sufficiently long to connect to an air compressor (not shown). After the drain plugs have been reinserted into the transmission compartment of the vehicle, the outlet line 74 is inserted into the fill hole of the transmission casing or the engine crankcase. The compressor is started thereby driving the diaphragm fluid pump 62 which withdraws fluid from within fluid receiving chamber 13 via drain 66 and line 70. The pump 62 then conveys the withdrawn fluid via line 72 through filter 64 where it is cleaned of metal particles or debris. The filtered fluid exits via line 74 and re-enters the transmission casing or crankcase. Optionally, should the operator prefer to discard or store the recovered fluid rather than filter it, he may simply open the drain cap 68 and allow the waste fluid to be drained by gravity along the sloped bottom surface 8 for disposal or storage.

FIG. 5

In another embodiment of the present invention, a 3-way valve 80 may be incorporated into drain 82. In a first position, the valve functions to operate the cart 2 as indicated on figures 1 through 4 by directing the fluid through the pump 62 and filter 64. In a second position, the valve 80 opens an optional line 84 to the fluid line 70 and the associated pump 62 and filter 64, and closes off suction from reservoir 13. This arrangement allows a separately collected fluid within container/tank 83 to be pumped and filtered for reuse. A third position of 3-way valve 80 allows the fluid collected in fluid receiving chamber 13 to be directly withdrawn through drain 82 thereby avoiding the use of the pump 62 and filter 64 arrangement. This fluid may be stored for later use or filtering or simply disposed of.

While this invention has been described as having preferred design, it is understood that it is capable of further modification, uses and/or adaptations of the invention following in general, the principle of the invention and including such departures from the present disclosure as come within known or customary practice in the art to which the invention pertains, and as may be applied to the essential features set forth, and fall within the scope of the invention or the limits of the appended claims.

What we claim is:

1. A low profile cart for the collection, filteration and recycle of fluid from machinery comprising:

a) a movable fluid receiving chamber having front, rear, bottom, left and right side panels forming a top opening;
   b) means connected to said cart for manually positioning said cart;
   c) drain means associated with said chamber and extending from said rear panel;
   d) side support means outside of said chamber and connected to one of said left and right side panels;
   e) said side support means having means for positioning pump and filter means;
   f) means for connecting said pump and filter means to said drain means;
   g) said chamber sloping from said front to said rear for permitting fluid in said chamber to be substantially and completely removed after collection from said chamber;
   h) whereby when said cart is connected to said pump and filter means and said pump is activated, said fluid collected in said chamber will be evacuated therefrom and run through said filter for eventual reuse.

2. A cart as in claim 1 and including:
   a) said chamber has front and rear decks and having said top opening extending between said front and rear decks.

3. A cart as in claim 2 and wherein:
   a) said positioning means comprising a movable elongated handle connected to said front deck.

4. A cart as in claim 3 and wherein:
   a) said handle movable from a rearward, stowed position on said cart to a forward position for manually positioning of said cart.

5. A cart as in claim 1 and wherein:
   a) said left and right side panels disposed at an inward angle towards said bottom panel.

6. A cart as in claim 1 and further including:
   a) wheel means positioned outboard of said left and right side panels and adjacent said front and rear panels.

7. A cart as in claim 6 and wherein:
   a) said wheel means supported by a flange extending outwardly from said left and right side panels.

8. A cart as in claim 7 and wherein:
   a) said wheel means includes guard plates positioned forward and rearward of said wheel means.

9. A cart as in claim 6 and wherein:
   a) said wheel means positioned adjacent to said rear panels at a height less than said wheel means positioned adjacent said front panels to provide front to rear receptacle slope.

10. A cart as in claim 9 and wherein:
    a) said front to rear receptacle slope extends from about one half inch to about three quarters inch in height.

11. A cart as in claim 1 and wherein:
    a) said fluid receiving chamber is uniform in height from said front to said rear.

12. A cart as in claim 1 and wherein:
    a) said side support means is a shelf.

13. A cart as in claim 12 and further including:
    a) pump and filter means positioned on said side support means.

14. A cart as in claim 13 and wherein:
    a) said shelf including end guards for protecting said pump and filter from inadvertent collision.

15. A cart as in claim 13 and wherein:
    a) said filter is a number 10 microfilter.

16. A cart as in claim 1 and wherein:
a) said connecting means includes a first fluid line extending from said drain means through said pump and filter to an outlet line.

17. A cart as in claim 16 and further including:
a) valve means in said connecting means operable in a first position for opening said connection between said drain means to said pump and filter and operable in a second position to close said connection.

18. A cart as in claim 17 and further including:
a) a second fluid line connectable to a second fluid source and to said valve so as to permit fluid in said second line to be drained and cycled through said pump and filter when said valve is shifted to a second position.

19. A cart as in claim 1 and further including:
a) door means provided for access to and closing of said top opening and comprising a pair of doors hingedly secured to a pair of top rails extending between said front and said rear decks.

20. A cart as in claim 19 and wherein:
a) one of said door means including a handle.

21. A cart as in claim 20 and wherein:
a) said door means overlying a portion of said front and rear decks and supported by said front and rear deck portions.

22. A cart as in claim 1 and wherein:
a) screen means positioned in said chamber to screen fluid entering said top opening.

23. A cart as in claim 22 and further including:
a) flange means extending along said side panels and said screen means supported on rail flange means.

24. A cart as in claim 23 and further including:
a) perforated baffle plate means positioned in said chamber and below said screen means and extending transverse of said chamber.

* * * * *